(12) United States Patent
Mørch Sørensen et al.

(10) Patent No.: US 12,729,853 B2
(45) Date of Patent: Sep. 8, 2026

(54) ARRANGEMENT HANDLING PURGED ALCOHOL-BASED FUEL AND A METHOD THEREOF

(71) Applicant: ALFA LAVAL CORPORATE AB, Lund (SE)

(72) Inventors: Torben Mørch Sørensen, Aalborg (DK); Søren Mølgaard, Støvring (DK); Lars Bo Andersen, Ulstrup (DK)

(73) Assignee: ALFA LAVAL CORPORATE AB, Lund (SE)

( * ) Notice: Subject to any disclaimer, the term of this patent is extended or adjusted under 35 U.S.C. 154(b) by 339 days.

(21) Appl. No.: 18/566,459

(22) PCT Filed: Jun. 15, 2022

(86) PCT No.: PCT/EP2022/066275
§ 371 (c)(1),
(2) Date: Dec. 1, 2023

(87) PCT Pub. No.: WO2022/268599
PCT Pub. Date: Dec. 29, 2022

(65) Prior Publication Data

US 2024/0255144 A1 Aug. 1, 2024

(30) Foreign Application Priority Data

Jun. 24, 2021 (EP) .................................... 21181558

(51) Int. Cl.
*B01D 53/00* (2006.01)
*B01D 45/02* (2006.01)
(Continued)

(52) U.S. Cl.
CPC ............. *F23G 7/066* (2013.01); *B01D 45/02* (2013.01); *B01D 53/002* (2013.01); *B63H 21/38* (2013.01);
(Continued)

(58) Field of Classification Search
None
See application file for complete search history.

(56) References Cited

U.S. PATENT DOCUMENTS

2012/0167547 A1 7/2012 Zhang et al.
2016/0123285 A1 5/2016 Laakso
2016/0298554 A1* 10/2016 Bandyopadhyay .......................... F02D 41/3047

FOREIGN PATENT DOCUMENTS

CN 102562301 A 7/2012
CN 110461706 A 11/2019
(Continued)

OTHER PUBLICATIONS

International Search Report (PCT/ISA/210) and Written Opinion (PCT/ISA/237) mailed on Oct. 25, 2022, by the European Patent Office as the International Searching Authority for International Application No. PCT/EP2022/066275.
(Continued)

*Primary Examiner* — Jorge A Pereiro
(74) *Attorney, Agent, or Firm* — BUCHANAN INGERSOLL & ROONEY PC

(57) ABSTRACT

An arrangement and a method for handling purged alcohol-based fuel originating from an alcohol fuel system configured to fuel an alcohol fueled engine, the arrangement comprising: a boiler system comprising a burner and a fuel inlet configured to selectively supply a fuel and thereby selectively sustain a primary flame in the burner for production of heat and/or steam in the boiler system, a purge connection configured to receive a purge mixture purged from the alcohol fuel system using an inert gas, the purge mixture comprising a mixture of the inert gas and purged alcohol-based fuel, and a vapor-liquid separator.

16 Claims, 2 Drawing Sheets

(51) Int. Cl.

| | |
|---|---|
| ***B63H 21/38*** | (2006.01) |
| ***B63J 99/00*** | (2009.01) |
| ***F23C 1/08*** | (2006.01) |
| ***F23D 17/00*** | (2006.01) |
| ***F23G 7/06*** | (2006.01) |
| ***F23K 5/10*** | (2006.01) |
| ***F23K 5/18*** | (2006.01) |
| *C10L 1/02* | (2006.01) |

(52) U.S. Cl.

CPC ................. *B63J 99/00* (2013.01); *F23C 1/08* (2013.01); *F23G 7/065* (2013.01); *F23K 5/10* (2013.01); *F23K 5/18* (2013.01); *B01D 2257/102* (2013.01); *B63J 2099/003* (2013.01); *C10L 1/02* (2013.01); *F23D 17/002* (2013.01); *F23G 2209/14* (2013.01)

(56) References Cited

FOREIGN PATENT DOCUMENTS

| | | | |
|---|---|---|---|
| GB | 2477372 | A | 8/2011 |
| JP | S55129696 | A | 10/1980 |
| JP | 2009056380 | A | 3/2009 |
| JP | 2015221645 | A | 12/2015 |
| JP | 6262076 | B2 | 1/2018 |
| JP | 2019-014335 | A | 1/2019 |
| JP | 2021-001591 | A | 1/2021 |
| KR | 101516169 | B1 | 4/2015 |
| KR | 20180071574 | A | 6/2018 |
| KR | 1020200096094 | A | 8/2020 |

OTHER PUBLICATIONS

MAN Diesel & Turbo, “Using Methanol Fuel in the MAN B&W ME-LGI Series”, Aug. 2014, pp. 1-16.

MAN Energy Solutions, “The Methanol-fuelled MAN B&W LGIM Engine”, Jan. 2021, pp. 1-24.

Offshore Energy, “Methanol Is Ready for Use as Marine Fuel”, Apr. 16, 2018, pp. 1-6.

Office Action (Notice of Preliminary Rejection) issued on Sep. 30, 2025, in corresponding Korean Patent Application No. 10-2024-7000477 and English translation of the Office Action. (13 pages).

Office Action (Notice of Reasons for Rejection) issued on Nov. 5, 2024, in corresponding Japanese Patent Application No. 2023-577427 and English translation of the Office Action. (13 pages).

Office Action issued on Jul. 21, 2026, by the Chinese Patent Office in Chinese Patent Application No. 202280044806.3 (6 pages).

* cited by examiner

ARRANGEMENT HANDLING PURGED ALCOHOL-BASED FUEL AND A METHOD THEREOF

FIELD OF THE INVENTION

The invention relates to an arrangement for handling purged alcohol-based fuel originating from an alcohol fuel system configured to fuel an alcohol fueled engine.

The invention also relates to a method for handling purged alcohol-based fuel originating from an alcohol fuel system configured to fuel an alcohol fueled engine.

BACKGROUND ART

Marine engines powered by oil or gas are well known in the art. Oil and gas fired boilers for marine steam production are also well known in the art. Usually, the choice of fuel for the boiler operation is made in relation to the fuels selected for the marine engine operation. Thus, if the marine engine is powered by oil, the boiler is often powered by oil as well. However, the marine engine and the boiler may be powered by different fuels.

One drawback with most of the marine engines of today is marine air pollution, especially carbon dioxide ($CO_2$), emitted from the marine engines when providing propulsion power. It is generally agreed that the $CO_2$ emissions, as well as other greenhouse gas emissions, have to be decreased in view of environmental aspects. As a solution, alternative fuels are gaining traction in the marine industry. This includes fuels like methanol, hydrogen, ammonia or conversion of biomaterials. However, by introducing alternative fuels, other problems may occur.

However, it has been found that the combustion in the methanol fueled marine engine may give rise to NOx-emissions, i.e. nitrogen oxide and nitrogen dioxide emissions. To address this issue, the methanol may be mixed with water, whereby the combustion temperature in the engine is decreased and thereby the amount of NOx is decreased.

However, this in turn gives rise to another issue. Otherwise, when a methanol fueled marine engine is stopped, the methanol in the engine and in the fuel system close to the engine is returned to the methanol tank. In JP6262076B2 there is disclosed a variant of such a set-up. The methanol may be drained or purged to a drain tank. The methanol in the drain may be returned to the methanol fuel tank.

However, this is rendered difficult when the methanol has been mixed with water.

Thus, although the alternative fuels may be more environmentally friendly regarding greenhouse gas emissions compared to the conventional fuels, there are still other problems that need to be overcome.

SUMMARY OF THE DISCLOSURE

It is an object of the disclosure to provide an arrangement which adequately addresses the set of design criteria of making it possible to efficiently use alternative fuels.

This object has been achieved by an arrangement for handling purged alcohol-based fuel originating from an alcohol fuel system configured to fuel an alcohol fueled engine, the arrangement comprising:

- a boiler system comprising
  - a burner, and
  - a fuel inlet configured to selectively supply a fuel and thereby selectively sustain a primary flame in the burner for production of heat and/or steam in the boiler system, and
- a purge connection configured to receive a purge mixture purged from the alcohol fuel system using an inert gas, the purge mixture comprising a mixture of the inert gas and purged alcohol-based fuel, and
- a vapor-liquid separator, wherein the arrangement is configured to selectively

- direct at least a vapour phase of the purge mixture from the purge connection to a vapour phase purge mixture inlet of the boiler system in case the boiler system is in a hot condition and is ready to receive and combust purge mixture, the vapour phase purge mixture inlet being configured to intermittently receive vapour phase of the purge mixture from the alcohol fuel system and supply the vapour phase of the purge mixture to the burner, wherein the burner is configured to combust the vapour phase of the purge mixture, or to selectively
- direct the purge mixture from the purge connection to the vapor-liquid separator separating the purge mixture into a vapour phase and a liquid phase, whereafter the liquid phase is stored in the vapor-liquid separator and/or in a separate tank until the boiler system is in a hot condition and is ready to receive and combust the liquid phase of the purge mixture.

Preferably, the alcohol fueled engine is a marine engine. The alcohol fueled engine is advantageous as it uses a more environmentally friendly fuel, namely an alcohol, for powering the engine compared to most fossil fuels used today, e.g. oil and gas. Preferably, the alcohol is methanol.

The arrangement is advantageous as it is capable of efficiently and environmentally friendly handle purge mixture originating from the alcohol fuel system. The purge mixture may be generated when the alcohol fueled engine switches fuel from alcohol to another fuel or when the alcohol fueled engine is shut down, either in a controlled manner or as a result of an emergency situation.

At this stage, the purge mixture contains alcohol, optionally mixed with water, and it would be desirous not just dispose it. Instead, the purge connection receives the purge mixture originating from the alcohol fuel system. It may in this context also be noted that the purge mixture is in both liquid phase and in vapour phase. As an example, at temperatures of about 30° C. methanol will have a vapour phase of about 25% and for temperatures of about 50° C. will have a vapour phase of about 55%, whereas the corresponding numbers for water is in the order of 4% and 12%. The purge mixture may e.g. have a temperature of about 25-40° C. and will thus have a significant fraction in vapour phase.

In case the boiler system is in a hot condition and is ready to receive and combust purge mixture, at least the vapour phase of the purge mixture is directed from the purge connection to a vapour phase purge mixture inlet of the boiler system and the burner combusts the vapour phase of the purge mixture, whereby heat or steam is produced. The purge mixture is preferably directed from the purge connection to the vapor-liquid separator separating the purge mixture into a vapour phase and a liquid phase irrespective of if the boiler system is in a hot condition or in a cold condition. If the boiler system is in a hot condition, at least the vapour phase is directly directed to the burner from the vapor-liquid separator. In this context it may be noted that the liquid phase of the purge mixture may also be directed to the burner via a separate liquid phase inlet and be combusted by the burner. However, the inventive concept is most useful when it comes to handling the vapour phase quickly and directly in case the boiler system is in a hot condition and is ready to receive and combust purge mixture. This is so since it is considered more cumbersome to handle the vapour phase of the purge mixture comprising the inert gas, vapour phase of the alcohol and optionally also vapour phase of water.

In case the boiler system is not in a hot condition and thereby is not ready to receive and combust purge mixture, the purge mixture is directed from the purge connection to the vapor-liquid separator separating the purge mixture into a vapour phase and a liquid phase, whereafter the liquid phase is stored in the vapor-liquid separator and/or in a separate tank until the boiler system is in a hot condition and is ready to receive and combust purge mixture.

Thus, with the inventive concept there is provided an arrangement which is capable of often directly making active use of the vapour phase of the purged mixture, rather than vent the vapour phase. When the boiler is in a hot condition, the vapour phase is disposed of by combusting the vapour phase directly in the burner. As mentioned above, the liquid phase may also be combusted directly or may be stored for later combustion.

When the boiler is in a cold condition, at least the liquid phase is stored for later combustion. Typically, it is only the liquid phase which is stored for later combustion. The vapour phase is in this case typically vented to the atmosphere. However, the inventive concept does not exclude that this vapour phase is handled in a different manner instead of being vented. However, in the currently preferred embodiment it is considered too cumbersome to store the pressurized vapour phase of the purge mixture and the vapour phase is therefore vented.

By being capable of burning the liquid phase and often also the vapour phase of the purge mixture in the burner, there is made efficient use of the energy content of the alcohol even though it was purged from the fuel system. The burner may combust the purge mixture as such or with the aid of a support flame. The support flame may be a separate support flame or alternatively, the primary flame may be used as a support flame.

Thus, a more efficient and thereby more environmentally friendly marine arrangement using alternative fuels, namely alcohols, is achieved.

It may be noted that the arrangement is especially advantageous in case the alcohol fueled engine is running on a mixture of alcohol and water. This latter is typically the case when the engine is running in an emission-controlled area where there are limits on the allowable amount of NOx-emissions. However, once the arrangement has been installed to handle such a purge mixture containing alcohol-based fuel containing water, it is conceivable that the arrangement may be used also to handle purge mixture originating from use cases where the alcohol fueled engine is running on alcohol without water being mixed with the alcohol. Thus, in the above the alcohol-based fuel may be a substantially pure alcohol fuel or may be a mixture of alcohol fuel and water. The mixture may contain significant amounts of water, sometimes as much as close to a 50% to 50% blend of water and alcohol fuel.

The inert gas used to purge the fuel system is preferably nitrogen. The inert gas is preferably pressurized. Thus, the nitrogen is preferably pressurized nitrogen. However, it should be noted that other inert gases may be used as well.

In this disclosure the term purge mixture is used for the mixture being purged from the fuel system irrespectively of if the fuel has been mixed with water or not.

In this disclosure the term alcohol-based fuel is used for the fuel both when it explicitly is mixed with water and when it may be mixed with water.

It may be noted that the phrase "in case the boiler system in a hot condition and is ready to receive and combust the purge mixture" may relate both to a case that the boiler system is in a production mode in which it produces steam and/or heat, and to a case that it is in a safety mode or purge mode in which there is no substantial production of steam and/or heat but merely that the boiler system is in a hot condition and is ready to receive and combust the purge mixture.

Preferably, the boiler may, when activated to combust purge mixture, run in 15-50%, preferably 25-50%, compared to full operation in the sense that the combustion as such or the support flame may be sustained by providing a fuel at a rate of 15-50%, preferably 25-50%, compared to the rate at which the fuel is provided when the boiler runs at full operation, thereby making sure that the purge mixture supplied to the burner is combusted also when the burner is activated for the purpose of combusting purge mixture and not activated an run in full operation to produce heat. In this context it may be noted that production of heat may refer to production of steam, heating hot water, heating a thermal fluid or heating any other media used in the boiler. If there is a need to sustain a support flame, the support flame typically has to be larger than what is typically denoted as a pilot flame because when a purge mixture typically requires the provision of a sustained support flame this is typically associated with the purge mixture being more difficult to ignite compared to the primary fuel.

When it comes to the inlets to the burner, the fuel inlet for the primary fuel and inlet or inlets for the purge mixture may be separate inlets. This is e.g. typically the case when the primary fuel is in gaseous form. If the primary fuel is in liquid from, the fuel inlet for the primary fuel and for the liquid phase of the purge mixture may be one and the same inlet.

The burner may also be of the kind being configured to be able to burn different kinds of fuels, a primary fuel and a secondary fuel. The secondary fuel may be a substitution for the primary fuel wherein the choice of primary fuel and secondary fuel may e.g. be dependent upon availability, cost, environmental impact, etc. The secondary fuel may e.g. be a fuel suitable to use to sustain a support flame for combustion of the purge mixture. The fuel inlet for a secondary fuel and the purge mixture inlet may be separate inlets. It may in this context be noted that the term purge mixture inlet is a term collectively used to include a vapour phase purge mixture inlet and/or a liquid phase purge mixture inlet. Thus, the term purge mixture inlet is primarily used when there is a general discussion of the different fuels and where there is no direct need to distinguish between the vapour phase purge mixture inlet and the liquid phase purge mixture inlet.

The purge mixture inlet for the vapour phase or for the liquid phase and the fuel inlet for the secondary fuel may, depending upon the secondary fuel being in gas phase or liquid phase, be one and the same inlet. This may be accomplished by a piping from the purge connection, directly or via the vapor-liquid separator, to a fuel system associated with the secondary fuel. This common inlet to the burner may be used to supply only the specific phase of the purge mixture in case the purged mixture is such that it can sustain a flame as such. In case the purge mixture is not capable of sustaining a flame as such, secondary fuel may be added to the specific phase of the purge mixture introduced into the fuel system to the inlet of the secondary fuel in such an amount that the resulting mixture of the specific phase of the purge mixture and secondary fuel becomes capable of sustaining a flame.

In accordance with one embodiment, the boiler system is configured to ignite a self-sustained flame of the purge mixture. This flame may be ignited by spark ignition and/or with the use of a pilot flame. This may be used if the flame of the purge mixture is self-sustained. This may e.g. be applicable if the purge mixture in question concerns a liquid phase and if the liquid phase as such is capable of sustaining a flame or if the liquid phase is capable of sustaining a flame when a secondary fuel, such as an alcohol, preferably the same alcohol, is added in such an amount that the resulting mixture of the liquid phase of the purge mixture and secondary fuel becomes capable of sustaining a flame.

In accordance with one embodiment, the boiler system is configured

- to ignite a support flame and to combust the purge mixture using said support flame, or
- to combust the purge mixture using the primary flame as a support flame.

If the flame of the purge mixture is not self-sustained, it is necessary to provide some kind of support flame. This may be a separate support flame or alternatively the primary flame may be used as a support flame. The boiler system may be configured to ignite a support flame by first igniting a pilot flame and then igniting the support flame from the pilot flame or, if a pilot flame is sustained, directly ignite the support flame from the pilot. Even if the flame of the purge mixture is self-sustained it may be useful to provide a support flame.

In one embodiment, the arrangement further comprises

- an alcohol fuel source for storing alcohol fuel, and
- a fuel supply line configured to supply fuel from the alcohol fuel source to the burner to sustain the support flame. This may e.g. be used as a secondary fuel system provided especially for, but not necessarily exclusively for, the provision of a support flame. This system could also be used as a primary fuel system in case the ship is operating in an area where emission requirements makes it unsuitable to run on the fuel otherwise used as a primary fuel.

The burner may e.g. be a of a steam atomizing type or a pressure atomizing type. A fuel may be supplied to provide a pilot flame for igniting the main fuel. This is often the case if the burner is of a steam atomizing type. Alternatively, the primary fuel may be supplied and be ignited with an igniter, such as a spark igniter, configured to ignite the fuel supplied to the burner. This latter is often the case if the burner is of a pressure atomizing type.

In one preferred embodiment, the fuel inlet is connected via a fuel supply line to a fuel source, the fuel source being configured to supply the fuel for the primary flame, the fuel being selected from the group consisting of liquefied natural gas; LNG, distillate and residual fuels.

This may e.g. include diesel, marine gas oil, very low Sulphur fuel oil, heavy fuel oil. The fuel may also be a biofuel. It should be noted that other type of fuels may be used as the fuel as well such as ammonia, hydrogen, and methanol. It should be noted that the fuel may comprise two types of fuel. The two types of fuel may be premixed with each other and supplied from the same fuel source or may be kept separate and be supplied from two different fuel sources. The fuel sources may e.g. be tanks. If the fuel comprises two types of fuel, being supplied from two different fuel sources, they may have one supply line each from the respective fuel tank to the burner, but they may share as well. If the two types of fuels being supplied from two different fuel sources with a supply line each, they may also have a fuel inlet each, or alternatively there is one fuel inlet which is connected to the two different supply lines such that the fuels from the two different fuel sources may be introduced into the burner the common inlet. The other fuel source may be configured to supply the fuel selected from the group consisting of liquefied natural gas, distillate and residual fuels. This may e.g. include diesel, marine gas oil, very low Sulphur fuel oil, heavy fuel oil. The fuel may also be a biofuel. It should be noted that other type of fuels may be used as the fuel as well such that ammonia, hydrogen, and methanol.

If the primary fuel is liquefied natural gas; LNG, it is typically preferred that the boiler system is a multi-fuel burner system or at least a dual fuel burner system, capable of burning fuels of different phases, gas phase and liquid phase. If the primary fuel is distillate and residual fuels, typically in liquid form, the boiler system may be a single fuel burner system in the sense that it is sufficient that it can burn fuels in liquid phase.

For instance, when operating a marine boiler system on traditional ISO8217 fuel oil; e.g. MDO/MGO/HFO, the system will take a given liquid, such as oil, from a fuel tank, and with a pump, supply the fuel to the boilers burner system. Depending on the fuel there will be heating or cooling requirements.

Operating on LNG is different as it comes in gas form. It can be performed e.g. in accordance with the following examples:

1: The Boil Off Gas; BOG can be directed via compressor to a Gas valve train; GVT, and from the GVT to the burner.

2: If BOG is not available, LNG can be pumped directly from the LNG tank, and evaporated with a heater before going to gas compressor, and from there to the boiler burner system.

As mentioned above, the system is especially useful for cases where the alcohol-based fuel supplied to the alcohol fueled engine comprises alcohol fuel mixed with water. It may be noted that preferably there is provided a separate storage tank for the alcohol and a separate storge tank for the water and that the mixing is provided in the fuel system.

The arrangement may further comprise the alcohol fuel system, the alcohol fuel system comprising:

- an alcohol fuel source for storing alcohol fuel,
- the alcohol fueled engine, and
- a fuel supply system configured to supply alcohol fuel from the alcohol fuel source to the alcohol fueled engine, and
- a purge source which contains the inert gas, and which is configured to purge alcohol-based fuel from the alcohol fuel system to the purge connection by flushing the inert gas through the alcohol fuel system.

The alcohol fuel in the alcohol fuel source is preferably in a substantially pure alcohol form. If there is a desire to use an alcohol-based fuel containing water, the water is added via the fuel supply system after the fuel supply system has acquired the alcohol from the alcohol fuel source but before it is introduced into the alcohol fueled engine.

The arrangement may further comprise a water source, wherein the fuel supply system is configured to mix water from the water source with alcohol fuel from the alcohol fuel source and thereby supply an alcohol-based fuel comprising a mix of alcohol and water to the alcohol fueled engine.

As mentioned above, the burner may be a multi-fuel burner system. It may e.g. be configured to burn at least two different fuels, such as two different liquid fuels, preferably one at the time. It may be configured to burn one or more liquids fuels in combination with burning one or more gaseous fuels, wherein the one or more liquid fuels, preferably one liquid fuel at the time, is burnt simultaneously as the one or more gaseous fuels, preferably one gaseous fuel at the time, is burnt.

The above-mentioned object has also been achieved by a method for handling purged alcohol-based fuel originating from an alcohol fuel system configured to fuel an alcohol fueled engine, the method comprising:

selectively supply a fuel and thereby selectively sustain a primary flame in a burner for production of heat and/or steam in a boiler system; and selectively direct at least a vapour phase of a purge mixture from a purge connection to a vapour phase purge mixture inlet of the boiler system, the purge connection being configured to receive a purge mixture purged from the alcohol fuel system using an inert gas, the purge mixture comprising a mixture of the inert gas and purged alcohol-based fuel, the vapour phase purge mixture inlet being configured to intermittently receive vapour phase of the purge mixture from the alcohol fuel system and supply the vapour phase of the purge mixture to a burner of the boiler system, wherein the burner is configured to combust the vapour phase of the purge mixture, or direct a purge mixture from a purge connection to a vapor-liquid separator, the purge connection being configured to receive a purge mixture purged from the alcohol fuel system using an inert gas, the purge mixture comprising a mixture of the inert gas and purged liquid alcohol-based fuel, the vapor-liquid separator separating the purge mixture into a vapour phase and a liquid phase, and store the liquid phase in the vapor-liquid separator and/or in a separate tank until the boiler system is in a hot condition and is ready to receive and combust the liquid phase of the purge mixture.

The advantages associated with the various features and the variants thereof has been discussed in detail with reference to the arrangement and that discussion is also applicable to the method. Similarly, different preferred embodiments, both explicitly claimed and not explicitly claimed, has been discussed in detail with reference to the arrangement. The corresponding preferred embodiments are also applicable to the method and the discussion is also applicable to the method. For sake of clarity, some of those preferred embodiments are explicitly mentioned in the following.

The method may further comprise igniting a self-sustained flame of the purge mixture.

The method may further comprise igniting a support flame and to combust the purge mixture using said support flame.

The method may further comprise combusting the purge mixture using the primary flame as a support flame.

The method may further comprise mixing water from a water source with alcohol fuel from an alcohol fuel source, supplying an alcohol-based fuel containing water to the alcohol fueled engine, whereby a purge mixture originating from purging the alcohol fuel system comprises the alcohol-based fuel containing water and the inert gas. In this context it may be repeated that the purge mixture includes both vapour phase and liquid phase.

The method may further comprise that the alcohol fuel system is purged in response to a shut-down of the alcohol fueled engine.

Preferably, the purge mixture forced out of the alcohol fuel system of the engine should not be able to be forced to other parts within the alcohol fuel system, but out from the system. The alcohol fuel system may comprise one or more valves configured to control the flow of the purge mixture when the alcohol fuel is being forced out of the alcohol fuel system.

The arrangement may further comprise fuel valve train and recirculation taking care of the alcohol that do not have to be purged. This may e.g. typically be alcohol present in those parts of the alcohol fuel system being comparably close to the fuel tank. This part may also be referred to as a low flashpoint fuel system. The alcohol in this part of the fuel system has typically not picked up too much dirt and has not been mixed with water and may typically be returned to the fuel tank.

The arrangement is preferably placed onboard a ship. The method is preferably performed onboard a ship. However, it may be noted that neither the arrangement, nor the method, is limited to be used onboard ship. The arrangement and the method may be useful for other applications where there is an engine and a boiler positioned nearby each other. This may e.g. be the case, apart from ships, in other marine applications. It may e.g. be platforms, such as platforms of the kind used for drilling for oil or gas. The arrangement and method may also be useful for land-based applications. The arrangement and method may e.g. be used for logging or mining applications.

The arrangement for handling purged alcohol-based fuel originating from an alcohol fuel system configured to fuel an alcohol fueled engine comprises in short: a boiler system comprising a burner and a fuel inlet configured to selectively supply a fuel and thereby selectively sustain a primary flame in the burner for production of heat and/or steam in the boiler system, a purge connection configured to receive a purge mixture purged from the alcohol fuel system using an inert gas, the purge mixture comprising a mixture of the inert gas and purged liquid alcohol-based fuel, and a vapor-liquid separator.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present disclosure, will be better understood through the following illustrative and non-limiting detailed description of preferred embodiments of the present disclosure, with reference to the appended drawings, where the same reference numerals will be used for similar elements, wherein.

DESCRIPTION OF EMBODIMENTS

The present disclosure will now be described more fully hereinafter with reference to the accompanying drawings, in which currently preferred embodiments of the disclosure are shown. This disclosure may, however, be embodied in many different forms and should not be construed as limited to the embodiments set forth herein; rather, these embodiments are provided for thoroughness and completeness, and fully convey the scope of the disclosure to the skilled person.

Figure 1:
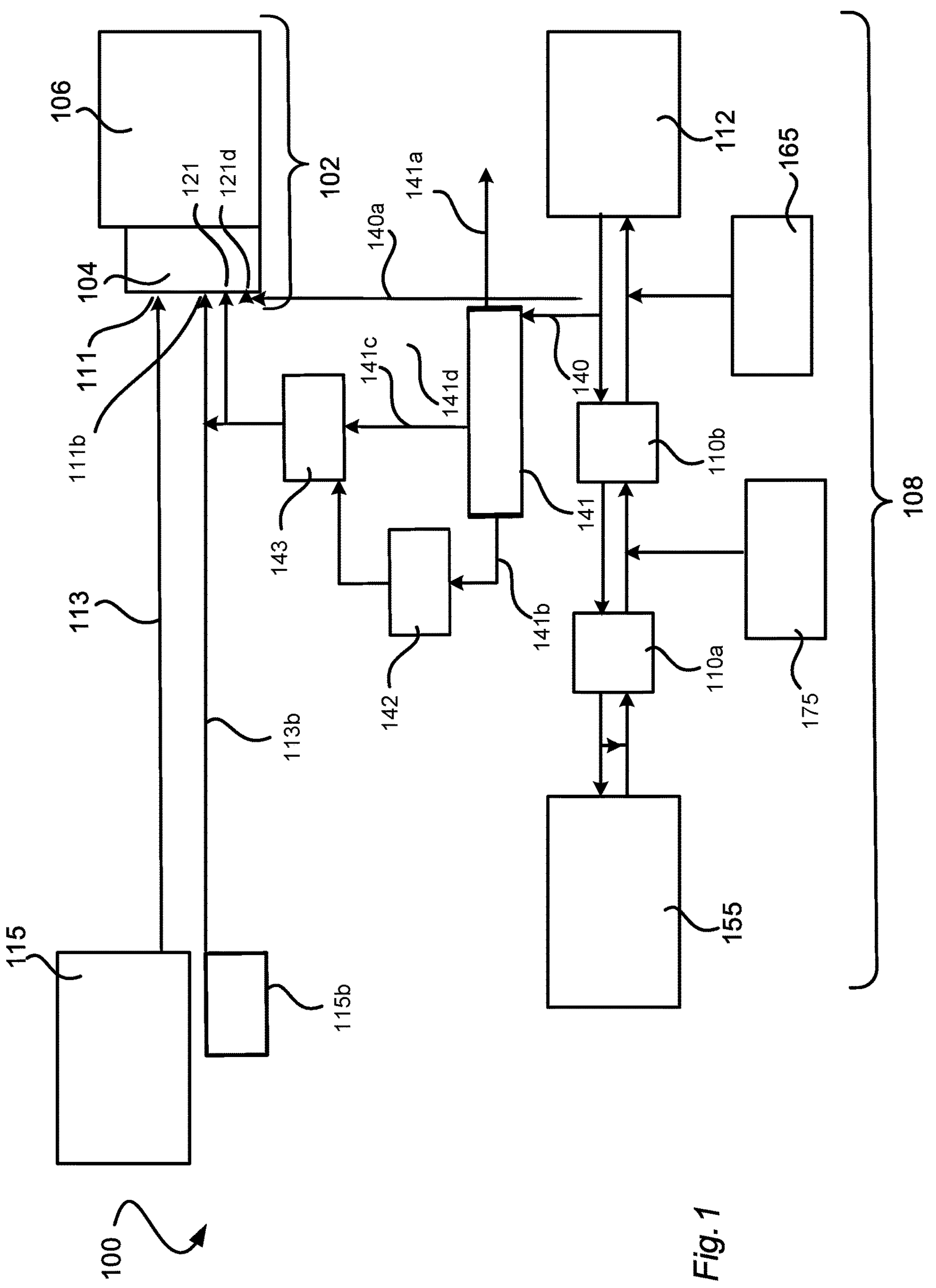
FIG. 1 discloses an arrangement handling purged alcohol-based fuel originating from an alcohol fuel system.

With reference to FIG. 1, there is disclosed an arrangement 100 for handling purged alcohol-based fuel originating from an alcohol fuel system 108 fueling an alcohol fueled engine 112. The arrangement 100 comprises a boiler system 102 and an alcohol fuel system 108. It may be said that the alcohol fuel system 108 comprises the alcohol fueled engine 112. Alternatively, it may be said that the alcohol fuel system 108 feeds alcohol fuel or alcohol-based fuel to the engine 112.

When the alcohol fueled engine 112 shuts down, either in a controlled manner or as a result of an emergency situation, there might be a desire to purge any alcohol-based fuel in the fuel system 108 out of the fuel system 108. This is especially relevant in case the alcohol has been mixed with water.

The boiler system 102 comprises a burner 104 and a fuel inlet 111 configured to selectively supply a fuel and thereby selectively sustain a primary flame in the burner 104 for production of heat and/or steam in the boiler system 102.

The burner 104 may be a multi-fuel burner configured to burn two different fuels one at the time or simultaneously. The burner 104 may be of pressure atomizing type. The burner 104 may alternatively be of steam atomizing type.

The fuel inlet 111 may be connected via a fuel supply line 113 to a fuel source 115, e.g. a fuel tank. The fuel source 115 is configured to supply the fuel, via the fuel inlet 111, to the burner 104. The fuel may be liquefied natural gas (LNG), distillate and residual fuels. This may e.g. include diesel, marine gas oil (MGO), very low Sulphur fuel oil (VLSFO), heavy fuel oil (HFO). The fuel may also be biofuel. However, it should be noted that the fuel may be other fuels as well. The fuel may comprise one or more type of fuels.

If the fuel comprises more than one type of fuel, the fuel inlet 111 may be connected to more than one fuel sources. Alternatively, there may be a parallel system with a second fuel source 115*b*, a second fuel line 113*b* and a second fuel inlet 111*b*. The other fuel may be any of the fuels listed above regarding the fuel. The different fuels may e.g. be two, or more, different liquid oils. In such a set-up they typically share the same inlet 111*a* to the burner 104. Alternatively, if the fuel comprises two types of fuel, one type may be a liquid fuel and the other type may be a gaseous fuel. In this latter case, there will be made use of one inlet for the liquid fuel and another inlet for the gaseous fuel.

In on preferred embodiment, there is a system, such as e.g. the second system, for providing an alcohol to the burner 104, preferably the same alcohol as is used in the alcohol fueled engine 112. This additional system may be utilized to sustain a primary flame for heat and/or steam production. The additional system may be utilized to provide a support flame to aid in the combustion of the alcohol-based fuel purged from the fuel system 108.

Thus, if the fuel comprises two types of fuel, one fuel type may be supplied from the fuel source 115 and the other fuel type may be supplied from one other fuel source 115*b*. Typically, the fuels are supplied to the burner 104 only one at a time. Typically, the fuel supply line 113 and 113*b* is operated, as illustrated in FIG. 1, in that the different fuels are provided one at a time making use of the same inlet 111, albeit at different times. However, it is also conceivable that there is one inlet 111 designed for the flows of fuel typically associated with heat and/or steam production whereas there is an additional separate inlet 111*b*. Such an additional separate inlet 111*b* is typically required e.g. if the burner 104 is configured to be able to burn both liquid and gaseous fuels. Such an additional separate inlet 111*b* may also or alternatively be designed for lower flows of fuel which could be of interest if the burner 104 is configured to be set in a specific mode primarily operated to combust the purged alcohol fuel or alcohol-based fuel. However, it should in this context be noted that such a separate inlet 111*b* typically cannot be a single nozzle used selectively for liquid or gaseous phase; typically there is provided one kind of one or more nozzles for liquid phase and a different kind of one or more nozzles for gaseous phase.

The alcohol fuel system 108 comprises an alcohol fuel source 155, a low flashpoint fuel supply system 110*a*, a fuel valve train 110*b* and the alcohol fueled engine 112. The alcohol fuel system 108 may comprise a purge source 165 or be connected to a purge source 165. The alcohol fuel source 155 may be an alcohol tank and is configured to store the alcohol before being supplied to the alcohol fueled engine 112. The fuel supply system 110*a*, 110*b* is configured to supply the alcohol within the alcohol fuel system 108. The alcohol fueled engine 112 is configured to be powered by the alcohol supplied from the alcohol fuel source 155. Between the low flashpoint fuel supply system 110*a* and the fuel valve train 110*b*, there is provided a connection to a water source 175. The addition of water from the water source 175 may be controlled by a separate valve or as part of the fuel valve train 110*b*. If the supply from the water source 175 is controlled by a separate valve, the addition of water to the alcohol may be provided before the fuel valve train 110*b* or alternatively after the fuel valve train 110*b*.

The purge source 165 is typically a gas tank containing inert gas. The inert gas from the purge source 165 is configured to purge alcohol fuel or alcohol-based fuel from the alcohol fuel system 108 to a purge connection 140. The part of the fuel system 108 after the low flash point fuel system 110*a* is typically the part being flushed or purged. The inert gas may be nitrogen. It should be noted that the inert gas may be any other inert gas or mixtures of inert gases as well.

The purge mixture purged from the fuel system 108 to the purge connection 140 is in the preferred embodiment directed to a vapor-liquid separator 141 irrespectively of if the boiler is in a hot condition or if the boiler is in a cold condition. In the vapor-liquid separator 141 the vapour phase of the purge mixture is separated from the liquid phase of the purge mixture. The vapor-liquid separator 141 may e.g. be a so-called knock-out drum.

If the boiler 102 is in a hot condition, the vapour phase of the purged mixture may be directed from the vapor-liquid separator 141 to the burner 104 via a separate connection 141*d* to a separate inlet 121*d*. Thus, the vapour phase of the purge mixture may be recovered by being burnt in the burner 104. The liquid phase may be stored in the vapor-liquid separator 141 and when it is considered suitable the liquid phase is directed from the vapor-liquid separator 141, via liquid outlet 141*b* to a storage tank 142 or via liquid outlet 141*c* to a fuel pump 143. This may e.g. be initiated by the vapor-liquid separator 141 not being capable of storing more liquid phase, by a decision to store some or all of the liquid phase in the tank 142 instead, or if the boiler system 102 is capable of receiving also liquid phase of the purge mixture, simultaneously as the vapour phase or after the vapour phase has been directed to the burner 104. It may be noted that the liquid outlets 141*b* and 141*c* may be a single outlet and that a valve takes care of directing the liquid phase either to the tank 142 or to the fuel pump 143.

If the burner boiler is in a cold condition, the vapour phase is in this embodiment vented from the vapor-liquid separator 141 via gas outlet 141*a*. The liquid phase is directed from the vapor-liquid separator 141, via liquid outlet 141*b* to a storage tank 142 or via liquid outlet 141*c* to a fuel pump 143.

The fuel pump 143 is configured to supply the liquid phase originating from the purge mixture to the burner 104. This may be via a liquid phase purge inlet 121. The liquid phase purge inlet 121 is preferably separated from the fuel inlet 111. If there is provided a second fuel source 115*b* and an associated fuel inlet 111*b* designed for alcohol, that fuel inlet 111*b* may, but need not, also be used as inlet for the liquid phase of the purge mixture.

Figure 2:
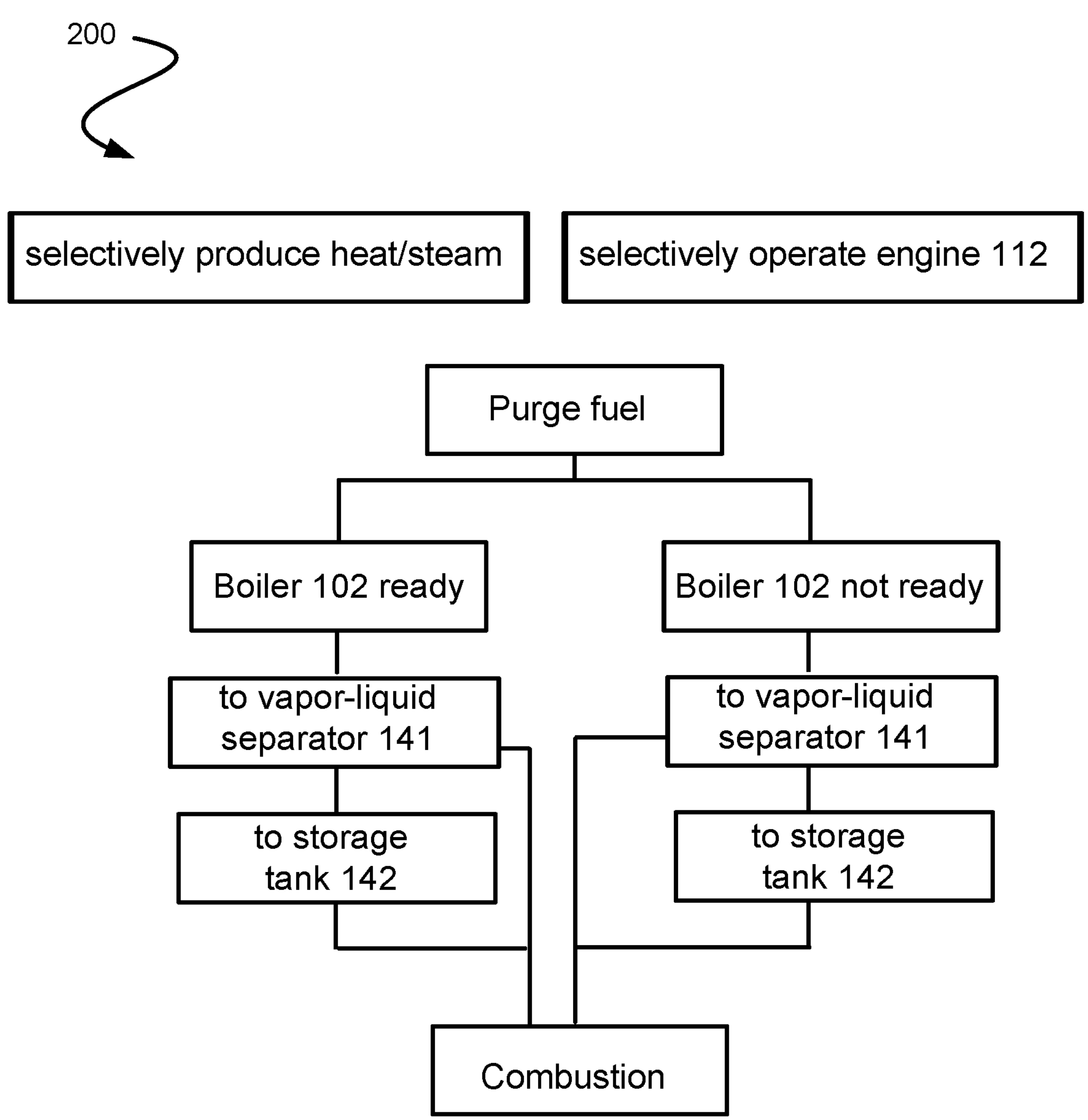
FIG. 2 discloses a flow chart illustrating a method for handling purged alcohol-based fuel originating from an alcohol fuel system.

With reference to FIG. 2, a flow chart 200 illustrating a method 200 handling purged alcohol-based fuel originating from an alcohol fuel system 108 configured to fuel an alcohol fueled engine 112 is shown by way of example.

The boiler system 102 is configured to selectively produce heat and/or steam. This is provided by selectively supply a fuel and thereby selectively sustain a primary flame in a burner 104 for production of heat and/or steam in a boiler system 102. The fact that the boiler system 102 is configured to selectively produce heat and/or steam in turn opens for different options and sets different limitation concerning how the purge mixture may be handled. The decision to selectively produce heat and/or steam is primarily made based on the actual need for heat and/or steam. The alcohol fueled engine 112 is also selectively operated. For a marine vessel this may e.g. be based on the need for propulsion power, and/or electrical production in auxiliary engines. As mentioned above, there occasionally arises a need to purge the fuel system 108 of the alcohol fueled engine 112. This selective operation of the boiler system 102, and the selective operation of the engine 112 and the occasional purging may be seen as a starting point allowing different routes for handling the purge mixture purged from the fuel system 108.

If the boiler system 102 is in a hot condition and is ready to receive and combust the purged alcohol-based fuel, the at least the vapour phase, and optionally also the liquid phase, of the purge mixture may be directed directly from the purge connection 140 via the liquid-vapour separator 141 and then directly to a vapour phase purged inlet 121*d* of the boiler system 102 wherein the burner 104 is configured to combust the vapour phase of the purge mixture. The vapour phase from the vapor-liquid separator 141 may be directed direct to the burner 104 via the connection 141*d* and the inlet 121*d*. The boiler system 102 being in a hot condition and being ready to receive and combust the purged alcohol-based fuel may e.g. be that the boiler system 102 is operating in a mode where it produces heat and/or steam based on a primary flame. Alternatively, it may also be that the boiler system 102 is operating in a purge mode or safety mode where purged alcohol is being combusted. This route is indicated by the left-hand part in FIG. 2. The solid line before the vapor-liquid separator 141 relates to a purged mixture comprising both vapour phase and liquid phase. After the vapor-liquid separator 141, the solid line indicates liquid phase and the dotted line indicates vapour phase. It may be noted that the liquid phase may be combusted directly simultaneously as the vapour phase or that the liquid phase may be temporarily be stored for combustion at a different timing.

If the boiler system 102 is not in a hot condition and thereby is not ready to receive and combust the purged alcohol-based fuel, the purge mixture is directed from the purge connection 140 to the vapor-liquid separator 141. The vapor-liquid separator 141 separates the purge mixture into a liquid phase and a vapour phase. The liquid phase of the purged mixture is stored in the vapor-liquid separator 141 and/or in a separate tank 142 until the boiler system 102 is in a hot condition and is ready to receive and combust the purged alcohol-based fuel. In this case, the vapour phase is vented 141*a* to the atmosphere. This route is indicated by the right-hand part in FIG. 2.

In this context it may be noted that production of heat may refer to production of steam, heating hot water, heating a thermal fluid or heating any other media used in the boiler.

The person skilled in the art realizes that the present disclosure by no means is limited to the preferred embodiments described above. On the contrary, many modifications and variations are possible within the scope of the appended claims.

The invention claimed is:

1. An arrangement for handling purged alcohol-based fuel originating from an alcohol fuel system configured to fuel an alcohol fueled engine, the arrangement comprising:

a boiler system comprising a burner, and a fuel inlet configured to selectively supply a fuel and thereby selectively sustain a primary flame in the burner for production of heat and/or steam in the boiler system, and a purge connection configured to receive a purge mixture purged from the alcohol fuel system using an inert gas, the purge mixture comprising a mixture of the inert gas and purged alcohol-based fuel, and a vapor-liquid separator, wherein the arrangement is configured to selectively direct at least a vapour phase of the purge mixture from the purge connection to a vapour phase purge mixture inlet of the boiler system in case the boiler system is in a hot condition and is ready to receive and combust purge mixture, the vapour phase purge mixture inlet being configured to intermittently receive vapour phase of the purge mixture from the alcohol fuel system and supply the vapour phase of the purge mixture to the burner, wherein the burner is configured to combust the vapour phase of the purge mixture, or to selectively direct the purge mixture from the purge connection to the vapor-liquid separator separating the purge mixture into a vapour phase and a liquid phase, whereafter the liquid phase is stored in the vapor-liquid separator and/or in a separate tank until the boiler system is in a hot condition and is ready to receive and combust the liquid phase of the purge mixture.

2. The arrangement according to claim 1, wherein the fuel inlet is connected via a fuel supply line to a fuel source, the fuel source being configured to supply the fuel for the primary flame, the fuel being selected from the group consisting of liquefied natural gas, distillate and residual fuels.

3. The arrangement according to claim 1, wherein the boiler system is configured to ignite a self-sustained flame of the purge mixture.

4. The arrangement according to claim 1, wherein the boiler system is configured to ignite a support flame and to combust the purge mixture using said support flame, or to combust the purge mixture using the primary flame as a support flame.

5. The arrangement according to claim 4, further comprising an alcohol fuel source for storing alcohol fuel, and a fuel supply line configured to supply fuel from the alcohol fuel source to the burner to sustain the support flame.

6. The arrangement according to claim 1, wherein the alcohol-based fuel supplied to the alcohol fueled engine comprises alcohol fuel mixed with water.

7. The arrangement according to claim 1, further comprising the alcohol fuel system, the alcohol fuel system comprising:

an alcohol fuel source for storing alcohol fuel, the alcohol fueled engine, and a fuel supply system configured to supply alcohol fuel from the alcohol fuel source to the alcohol fueled engine, and a purge source which contains the inert gas, and which is configured to purge alcohol-based fuel from the alcohol fuel system to the purge connection by flushing the inert gas through the alcohol fuel system.

8. The arrangement according to claim 7, further comprising a water source, wherein the fuel supply system is configured to mix water from the water source with alcohol fuel from the alcohol fuel source and thereby supply an alcohol-based fuel comprising a mix of alcohol and water to the alcohol fueled engine.

9. The arrangement according to claim 1, wherein the burner is a multi-fuel burner system configured to burn at least two different fuels, preferably one at the time, or to burn one or more liquids fuels in combination with burning one or more gaseous fuels, wherein the one or more liquid fuels, preferably one liquid fuel at the time, is burnt simultaneously as the one or more gaseous fuels, preferably one gaseous fuel at the time, is burnt.

10. The arrangement according to claim 1, wherein the inert gas is nitrogen.

11. A method for handling purged alcohol-based fuel originating from an alcohol fuel system configured to fuel an alcohol fueled engine, the method comprising:

selectively supply a fuel and thereby selectively sustain a primary flame in a burner for production of heat and/or steam in a boiler system; and selectively direct at least a vapour phase of a purge mixture from a purge connection to a vapour phase purge mixture inlet of the boiler system, the purge connection being configured to receive a purge mixture purged from the alcohol fuel system using an inert gas, the purge mixture comprising a mixture of the inert gas and purged alcohol-based fuel, the vapour phase purge mixture inlet being configured to intermittently receive vapour phase of the purge mixture from the alcohol fuel system and supply the vapour phase of the purge mixture to a burner of the boiler system, wherein the burner is configured to combust the vapour phase of the purge mixture, or direct a purge mixture from a purge connection to a vapor-liquid separator, the purge connection being configured to receive a purge mixture purged from the alcohol fuel system using an inert gas, the purge mixture comprising a mixture of the inert gas and purged liquid alcohol-based fuel, the vapor-liquid separator separating the purge mixture into a vapour phase and a liquid phase, and store the liquid phase in the vapor-liquid separator and/or in a separate tank until the boiler system is in a hot condition and is ready to receive and combust the liquid phase of the purge mixture.

12. The method according to claim 11, further comprising igniting a self-sustained flame of the purge mixture.

13. The method according to claim 11, further comprising igniting a support flame and to combust the purge mixture using said support flame, or combusting the purge mixture using the primary flame as a support flame.

14. The method according to claim 11, further comprising mixing water from a water source with alcohol fuel from an alcohol fuel source, supplying an alcohol-based fuel containing water to the alcohol fueled engine, whereby a purge mixture originating from purging the alcohol fuel system comprises the alcohol-based fuel containing water and the inert gas.

15. The method according to claim 11, wherein the alcohol fuel system is purged in response to a shut-down of the alcohol fueled engine.

16. The arrangement according to claim 1, wherein the burner is a multi-fuel burner system configured to burn at least two different fuels, one at the time, or to burn one or more liquids fuels in combination with burning one or more gaseous fuels, wherein the one or more liquid fuels is burnt, one liquid fuel at a time, simultaneously as the one or more gaseous fuels is burnt one gaseous fuel at a time.

* * * * *